United States Patent [19]

Takimoto et al.

[11] Patent Number: 5,443,864
[45] Date of Patent: Aug. 22, 1995

[54] SPATIAL LIGHT MODULATOR AND A NEURAL NETWORK CIRCUIT

[75] Inventors: Akio Takimoto; Koji Akiyama, both of Neyagawa; Michihiro Miyauchi, Nagoya; Yasunori Kuratomi, Suita; Koji Nomura; Hisahito Ogawa, both of Ikoma; Junko Asayama, Suita, all of Japan

[73] Assignee: Matsushita Electric Industrial Co., Ltd., Osaka, Japan

[21] Appl. No.: 270,492

[22] Filed: Jul. 5, 1994

Related U.S. Application Data

[62] Division of Ser. No. 816,734, Jan. 3, 1992, Pat. No. 5,364,668.

[30] Foreign Application Priority Data

Jan. 9, 1991 [JP] Japan .................. 3-001145

[51] Int. Cl.⁶ .......................... G02F 1/1337
[52] U.S. Cl. .......................... 428/1; 359/75; 359/76
[58] Field of Search .................. 428/1, 473.5; 359/75–78

[56] References Cited

U.S. PATENT DOCUMENTS

| | | | |
|---|---|---|---|
| 5,046,822 | 9/1991 | Matsuda et al. | 359/75 |
| 5,130,830 | 7/1992 | Fukushima et al. | 359/75 |
| 5,135,678 | 8/1992 | Murata et al. | 359/75 |

FOREIGN PATENT DOCUMENTS

| | | |
|---|---|---|
| 0160302 | 11/1985 | European Pat. Off. . |
| 0282254 | 9/1988 | European Pat. Off. . |
| 0389092 | 9/1990 | European Pat. Off. . |
| 2174399 | 11/1986 | United Kingdom . |

Primary Examiner—Alexander S. Thomas
Attorney, Agent, or Firm—Wenderoth, Lind & Ponack

[57] ABSTRACT

The present invention relates to a spatial light modulator used for an optical computing system or display, which comprises a photoconductive layer having a rectification function for receiving incident lights to generate charges, an electrode for accumulating the charges and a ferroelectric liquid crystal layer for modulating the incident light according to bias voltage change with the accumulated charges, wherein the ferroelectric liquid crystal layer is arranged between a pair of alignment layers made of polyimide represented by the general formula (I);

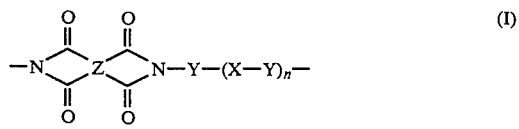

wherein n is 2 or more, X is O, S, Se or Te, Y is an aromatic group or a substituted aromatic group, and Z is a group containing an aromatic group. In the spatial light modulator, any charges are not accumulated on the alignment layer with the driving time and thus a bistable memory condition can be realized.

2 Claims, 5 Drawing Sheets

Fig. 3(a)           Fig. 3(b)
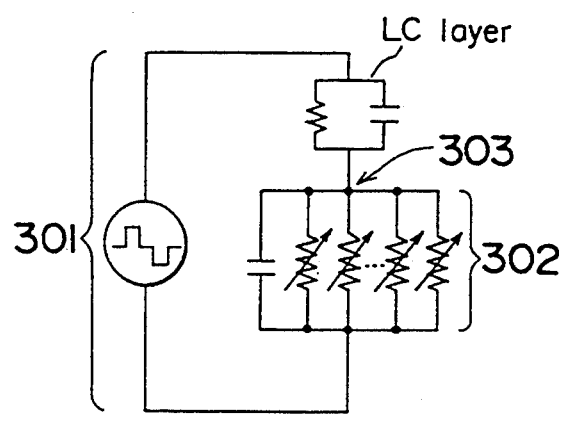
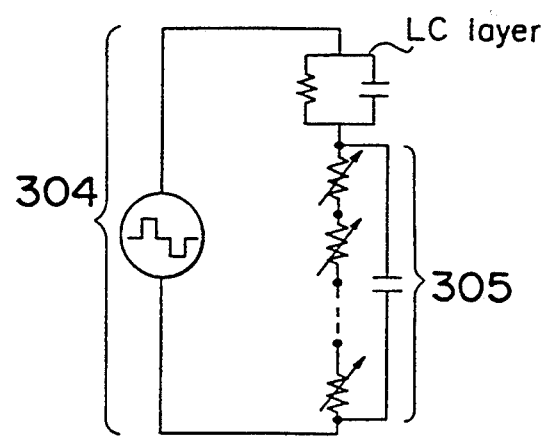
Fig. 7
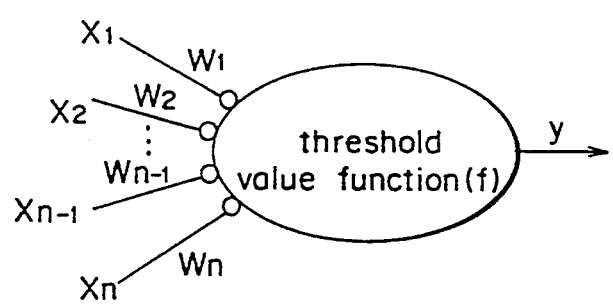
| product | summation | thresholding |
$$y = f\left(\sum_{i=1}^{n} x_1 w_1 - \Theta\right)$$

($\mu w / cm^2$)

SPATIAL LIGHT MODULATOR AND A NEURAL NETWORK CIRCUIT

This is a divisional application of now allowed Ser. No. 07/816,734 filed Jan. 3, 1992, now U.S. Pat. No. 5,364,668.

THE FIELD OF THE INVENTION

The present invention relates to a spatial light modulator used for an optical computer and a display and also a neural network system with ability perform input and output operation such as pattern recognition, associative memory and parallel calculations analogous to actions and operation in neuron system.

THE PRIOR ART

In general, a spatial light modulator is an important device for realizing an optical calculation such as an optical logic calculation and an optical neural computing, etc.. Especially, a parallel characteristic of light is matched to a neural network system wherein calculation is carried out by means of parallel dynamics and does not require distribution lines as used in an electric circuit so that it is easy to realize multi-connections between neurons, thereby many kinds of construction for the optical neural computing have been proposed.

One of many important calculations by neural computing is a summation for a plurality of incident lights, which result is subjected to a thresholding processing treatment. For making the neural network into hardware systematization, there is needed a spatial light modulator having such a computing function. In Japanese patent unexamined publication No. 144524/1990 and No. 256027/1990, there are reported an example of the optical neural computer realized by a spatial light modulator provided with an ability of summation and thresholding processing function. In the references, there are disclosed an optical thresholding device wherein a multi photoconductive layer arranged in series is electrically connected to a liquid crystal layer or wherein a multi photoconductive layer arranged in series, is electrically connected to a field effect transistor and a liquid crystal layer, and also a neural network device constructed by the optical theresholding devices.

The optical neural computing system is constructed in a basic manner that a light emitting from a light source, which provides an input information, is injected through an optical mask pattern corresponding to a synaptic load, into an optical thresholding device to read out a resulting thresholding output. In the case of providing a learning function with the optical neural system, as an optical mask there is used a rewritable spatial light modulator in which a light transmissivity is controllable by means of field application and light incidence. In the Other case of providing no learning function, there is used a fixed mask pattern.

Therefore, in a conventional case of an optical thresholding device and a neural network constructed thereby, there is a problem that high speed calculation is not possible because of synaptic combination in series. On the other hand, in the case of any other spatial light modulator, there is carried out a threshold processing by means of an electronic circuit and computer because of no provision with a light summation and threshold processing function. Accordingly, the threshold processing requires an light-electric translation and thus it is difficult to realize a hierarchy arrangement of network because of not fully utilizing a light parallel characteristic.

SUMMARY OF THE INVENTION

For overcoming the conventional problems, there is proposed a spatial light modulator provided with an ability of a light summation and threshold processing at high speed. The light summation function is realized by parallel connection of photoconductive layer corresponding to each synapse connection. In detail, the spatial light modulator comprising a photoconductive layer having a rectification function and a ferroelectric liquid crystal layer in a laminated form generally makes it possible to improve the response time and the light sensitivity. The spatial light modulator can be driven by means of applying alternatively positive and negative pulses of voltage. In this case, however, rectification function of the photoconductive layer makes itself to be in an equivalent condition wherein the ferroelectric liquid crystal layer is applied by a direct bias voltage. Accordingly, there is a problem that charges are accumulated on a dielectric alignment film with the driving time, thereby the ferroelectric layer can not realize a bistable memory condition and an optical calculation is impossible.

Therefore, according to the first aspect of the present invention, there is provided a spatial light modulator comprising a photoconductive layer having a rectification function and a ferroelectric liquid crystal layer (hereinafter referred to as FLC), wherein the FLC layer is arranged between a pair of polyimide layers represented by the general formula (I);

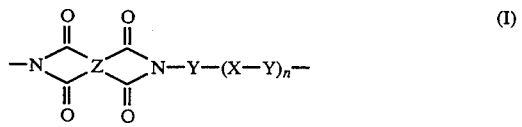

wherein n is 2 or more, X is O, S, Se or Te, Y is a aromatic group or a substituted aromatic group, and Z is a group containing an aromatic group.

The above polyimide of the general formula (I) is obtained by reacting a diamine represented by the below formula (II) with a carboxylic acid containing Z group defined as above to give a polyimide precursor and a coated film of the precursor on a desired substrate is subjected to a heated condensation polymerization reaction.

Therefore, according to the present invention, the alignment layer or film is made of the polyimide material represented by the formula (I) in which charges are hardly accumulated because the diamine component represented by the formula (II) in the polyimide structure;

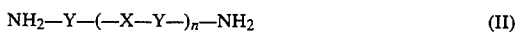

$$NH_2-Y-(-X-Y-)_n-NH_2 \qquad (II)$$

wherein n is 2 or more, X is O, S, Se or Te, and Y is an aromatic group or a substituted aromatic group, is superior in an ability by which charges are transported, thereby charges are not accumulated on the orientation film with the driving time, thereby the FLC layer can realize a bistable memory condition and an optical calculation is possible. That is, FIG. 3(a) shows equivalent circuit of device construction according to the present invention in comparison to the conventional case shown in FIG. 3(b). As shown in FIG. 3(a), when an optical summation is required in the present invention case 301, a photoconductive layer 302 corresponding to each synapse connection is combined in parallel to any other conductive layers and a resultant light current is collected by a common electrode 303, wherein a response speed is determined by CR time constant calculated from the value of resistance R obtained under a large quantity of radiation, which is synapse connection having a smallest electric resistance. On the other hand, each synapse connection 305 in the case of the conventional construction 304 is combined with each other in series, thereby accomplishment of a total sum calculation requires a long response time calculated from the value of CR time constant determined by synapse connection having a large resistance under a small quantity of light radiation.

The spatial light modulator has two types; one is a reflection type used for a high bright projection display device provided with a larger opening rate and a multistage optical processing device in which an output light can be amplified to use it as a next stage input light; the other is a transmission type used for an optical processing device in which two or more lights, each having a different wavelength, can be processed and a thin transmission display device which displays with a single color light.

The former modulator is typically shown in FIG. 1, which generally comprises (1) a first laminated plate comprising a transparent dielectrical substrate 101, for example made of glass material, a transparent electric conductive electrode 102, a photoconductive layer 103, plural reflective electrodes 104 separated each other on the surface of the photoconductive layer 103 for collecting charges generated on the photoconductive layer 103 and reflecting incident lights from the direction opposite to the photoconductive layer 103 and an alignment layer 105; (2) a second laminated plate comprising a transparent dielectrical substrate 109, a transparent electric conductive electrode 108 and an alignment layer 105; and (3) a ferroelectric liquid crystal 106 inserted between both alignment layers of the first and second plates, wherein incident light 113 is received by the photoconductive layer 103, on which there is generated charges which are collected by the reflective electrodes 104, thereby a voltage change applied to the FLC layer changes the liquid crystal alignment, so that an output modulated reflective light 114 is obtained.

The latter modulator is typically shown in FIG. 2, which generally comprises (1) a first laminated plate comprising a transparent dielectrical substrate 201, for example made of glass material, a transparent electric conductive electrode 202, a photoconductive layer 203, a transparent electric conductive electrode 204 for collecting charges generated on the photoconductive layer 203 and making incident lights 213 passed through the photoconductive layer 203 and an alignment layer 205; (2) a second laminated plate comprising a transparent dielectrical substrate 209, a transparent electric conductive electrode 208 and an alignment layer 207; and (3) a ferroelectric liquid crystal 206 inserted between both alignment layers 205 and 207 of the first and second plates, wherein incident light is received by the photoconductive layer 203, on which there is generated charges which are collected by the transparent electrode 204, thereby a voltage change applied to the FLC layer changes the liquid crystal alignment, so that an output modulated light 214 is obtained. The alignment layers are made of the polyimide represented by the general formula (I). Examples of the aromatic and substituted aromatic group represented by Y in the general formula (I) include condensed polycyclic hydrocarbons which may be substituted (comprising benzene, anthracene, naphthalene, pyrene, perylene, naphthacene, benzoanthracene, benzophenanthrene, crycene, triphenylene, phenanthrene, etc.) and condensed polycyclic quinones which may be substituted (comprising anthraquinone, dibenzopyrenequinone, anthoanthrone, isoviolanthrone, pyranthrone, etc.), non-metal phthalocyanine, metal phthalocyanine containing copper, lead, nickel, aluminium and etc., indigo, thioindigo and their derivatives.

The formulas (III) to (VII) represent the polyimides having different diamines components; in (III), (X,Y) is (S, benzene ring), in (IV), (X,Y) is (Se, benzene ring), in (V), (X,Y) is (S, naphthalene), in (VI), (X,Y) is (S, anthracene) and in (VII), (X,Y) is (S, perylene).

The formulas (VIII) to (XIII) represent the polyimides having different carboxylic acids defined by Z group in the general formula (I); (VIII) represents 3,3',4,4'-benzophenonetetracarboxylic dianhydride, (IX) 3,3',4,4'-biphenyltetracarboxylic dianhydride, (X) 1,1',5,5'-biphenyltetracarboxylic dianhydride, (XI) naphthalene-1,4,5,8-tetracarboxylic dianhydride, (XII) naphthalene-2,3,6,7-tetracarboxylic dianhydride and (XIII) perylene-3,4,9,10-tetracarboxylic dianhydride. In the following formulas m represents the degree of polymerization and n is as defined above.

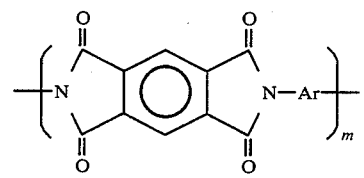

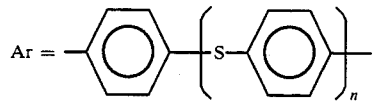
(III)

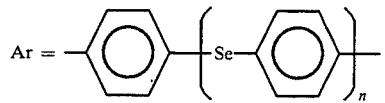
(IV)

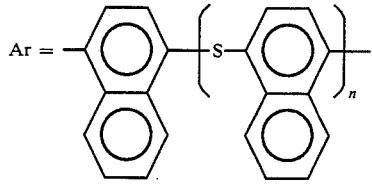
(V)

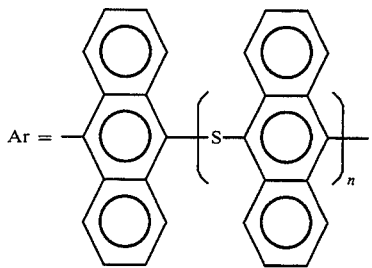
(VI)

Ar = (VII)

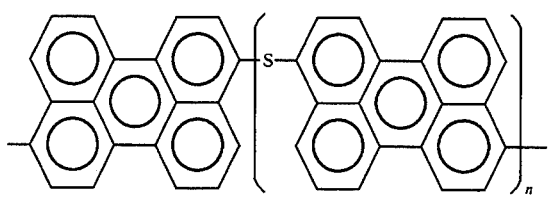

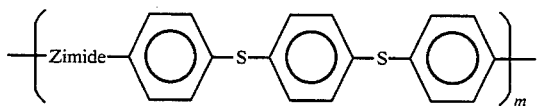

Zimide = (VIII)

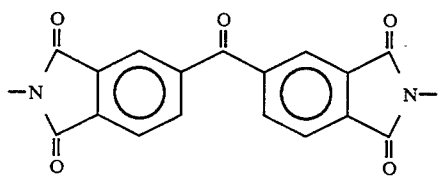

Zimide = (VX)

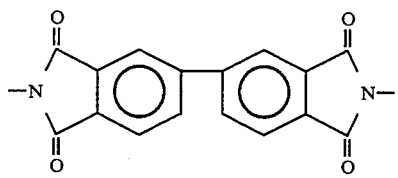

Zimide = (X)

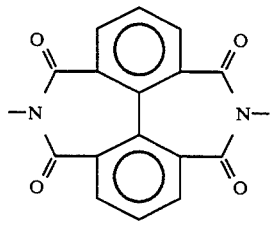

Zimide = (XI)

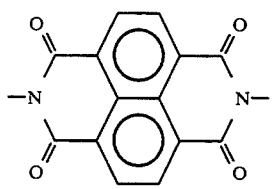

Zimide = (XII)

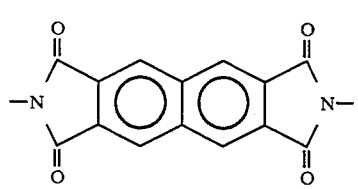

Zimide = (XIII)

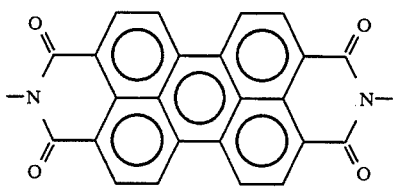

The material used for the photoconductive layer 103 has an ability to act as a dielectric substrate in the dark and lose the dielectric characteristic by the photoconductive property at the light injection time. Examples of the above materials include compound semiconductor (CdS, CdTe, CdSe, ZnS, ZnSe, GaAs, GaN, GaP, GaAlAs, InP and the like), amorphous semiconductor (Se, SeTe, AsSe), multi-crystal or amorphous semiconductor (Si, Ge, Si1-xCx, Si1-xGex, Ge1-xCx(0<X<1)).

Further, there are exemplified (1) phthalocyanine pigment (hereinafter referred as Pc) such as metal free Pc, XPc (X is Cu, Ni, Co, TiO, Mg, Si(OH), and the like), AlClPcCl, TiOClPcCl, InClPcCl, InBrPcCl, InClPc, InBrPcBr and the like, (2) azo pigments such as a monoazo pigment, disazo pigment and the like, (3) penyrene pigments such as penyrene anhydride and penyrene acid imide and the like, (4) indigoid dyes, (5) quinacrydone pigments, (6) polycyclic quinones such as anthraquinone, pyrenequinone and the like, (7) cyanine pigment, (8) xanthene dyes, (9) carrier-transfer complex such as PVK/TNF and the like,

(10) eutectic complex synthetized by pyrylium salt dye and polycabonate resin,

(11) organic semiconductor such as azuleniumsalt compound and the like.

In the case of the photoconductive layer 103 made of amorphous Si, Ge, Si1-xCx, Si1-xGex, Ge1-xCx (hereinafter referred to as a-Si, a-Ge, a-Si1-xCx, a-Si1-xGex, a-Ge1-xCx), it may contain hydrogen and halogen and also may contain oxygen or nitrogen for decreasing the dielectric constant and increasing the electrical resistivity. For controlling the electric resistivity, p-type impurities such as B, Al, Ga and the like or n-type impurities such as P, As, Sb and the like may be added. Such amorphous materials added with the impurities are laminated to form p/n, p/i, i/n, p/i/n junction and the like and thus to make depletion layer in the photoconductive layer 103, thereby the dielectric constant and dark resistivity or operating voltage polarity may be controlled. Depletion layer in the photoconductive layer may be formed by laminating 2 or more kinds of the above materials as well as such amorphous materials to form hetero-junction. Thickness of the photoconductive layer 103 is preferably 0.01 to 100 micron.

The alignment direction of FLC molecules in layers 105 and 107 is set parallel to the layer direction. The thickness of the alignment layer is less than 1000 Å, preferably less than 100 Å. The polarization directions of the polarizer 110 and analyzer 111 are orthogonal to each other. A material of the liquid crystal 109 may be ferroelectric chiral smetcic-C liquid crystal. It is necessary to have about 2 μm in thickness of FLC layer in the transport type and about 1 μm in the reflective type for obtaining output lights of strong contrast.

On the other hand, the spatial light modulator according to the present invention is suitable for components of an optical neural network, because of provision of the precise summation and thresholding processing function. That is, the optical neural network must have at least same processing functions provided in a neuron which is consisting of integrating operation, summation and thresholding operation as shown in FIG. 7. Therefore, the neural network according to the present invention, which comprises an input means for projecting an input light, an optical mask means to modulate a light intensity of the input light and a spatial light modulator according to the present invention, wherein the input light is changed in a light intensity for integrating-operation by passing through the optical mask means and then the output light is injected into a reflective electrode 104 in the case of the reflective type modulator 102 or a transparent electric conductive electrode 204 in the case of the transmissive type modulator 202 for summation processing and finally the summed output light is passing through the ferroelectric liquid crystal layer 106 or 206 of the modulator 102 or 202 to be subjected to a thresholding processing. In the case of assembling a neural network provided with parallel and high speed characteristics of light, connections between neurons and integrating operation corresponding to synapse connection function must be realized by means of light paths and optical operations. Therefore, according to the present invention, there are provided an optical mask means and a lenslet array arranged in a form of planar structure to the all-optical neural network.

BRIEF DESCRIPTION OF THE DRAWINGS

FIG. 3($a$),($b$) are diagrams showing equivalent circuits corresponding to the spatial light modulator according to the present invention and the conventional one.

FIG. 7 is a schematic view showing neural network function.

DETAILED DESCRIPTION OF THE INVENTION

Figure 1:
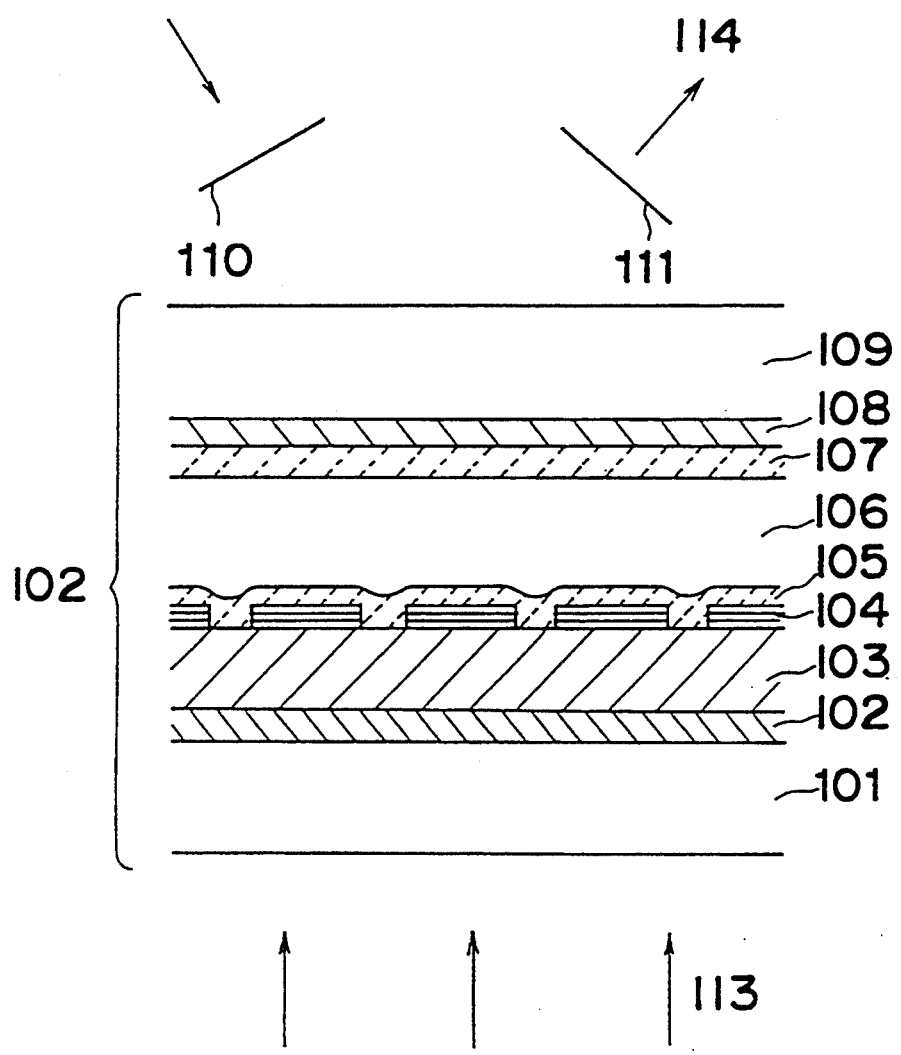
FIG. 1 is a sectional elevation of the reflective type spatial light modulator according to the first embodiment of the present invention.

FIG. 1 shows a sectional elevation of a spatial light modulator according to the present invention, which is a reflective type one. In FIG. 1, a transparent electric conductive layer 102, for example which comprises ITO or SnOx, is formed on a glass plate 101 as a transparent dielectric substrate. Further, there is laminated a photoconductive layer 103, on which there is formed a reflective electrode 104, on which there is laminated an alignment layer 105 subjected to a rubbing treatment, which comprises a polyimide represented by the formula (I). Between this multi-laminated lower plate 101 and the upper glass plate 109 on which a transparent electric conductive layer 108 and a polyimide alignment layer 107 are laminated in turn in the same manner as above, FLC layer 106 is inserted and upward of the glass plate 109 there are arranged a polarizer 110 and a light-sensing device 111 to construct a spatial light modulator 112.

In the above case, incident lights 113 are received by a photoconductive layer 103 to generate charges therein, which are accumulated on the reflective electrode 104 by applying a voltage thereto. According to the accumulated amount of charges, the applied voltage on the ferroelectric liquid crystal can be changed. That is, the increased charge amount increases the applied voltage. Thereby, change of liquid crystal alignment thus resulted modulates a reflective light, which is injected through the polarizer 110 into the ferroelectric liquid crystal 106 and reflected on the reflective electrode 104 and emitted from the light-sensing device 114.

Figure 2:
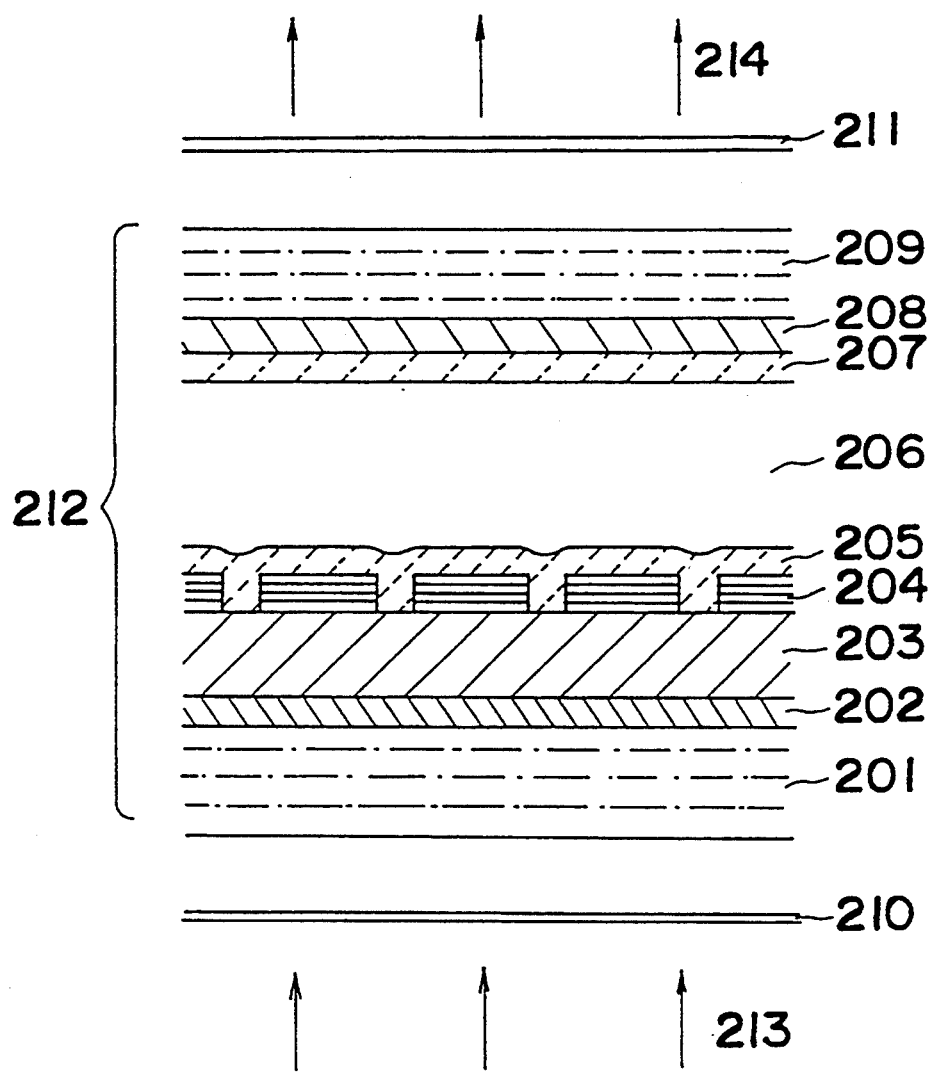
FIG. 2 is a sectional elevation of the transmission type spatial light modulator according to the second embodiment of the present invention.

FIG. 2 shows a sectional elevation of a spatial light modulator according to the present invention, which is a transmissive type one. In FIG. 2, a transparent electric conductive layer 202, for example which is made of ITO or SnOx, is formed on a glass plate 201 as a transparent dielectric substrate. Further, there is laminated a photoconductive layer 203, on which there is formed a transparent conductive electrode 204, for example which is made of ITO or SnOx, on which there is laminated an alignment layer 105 subjected to a rubbing treatment, which comprises a polyimide represented by the formula (I). Between this multi-laminated lower plate 201 and the upper glass plate 209 on which a transparent electric conductive layer 208 and a polyimide alignment layer 207 are laminated in turn in the same manner as above, a FLC layer 206 is inserted and outside the glass plate 209 there is arranged a light-sensing device 211 and outside the glass plate 201 there is arranged a polarizer 210 to construct a spatial light modulator 212.

In the above case, incident lights 213 are received by a photoconductive layer 103 to generate charges therein, which are accumulated on the transparent conductive electrode 204 by applying a voltage thereto. According to the accumulated amount of charges, the applied voltage on the ferroelectric liquid crystal can be changed. That is, the increased charge amount increases the applied voltage. Thereby, change of liquid crystal alignment thus resulted modulates to a certain degree a light transmitted through the polarizer 210, the photoconductive electrode 203 and the FLC layer 206 on each of the transparent conductive electrode 204, to obtain an output light 214 passed through the light-sensing device 211.

EXAMPLE 1

As shown in FIG. 1, ITO film of 0.05 to 0.5 $\mu$m in thickness is laminated on a glass plate 101 by means of sputtering method to prepare a transparent conductive electrode 102. Thereon, hydrogenated amorphous silicon (a-Si:H) film of 1 to 3 $\mu$m in thickness provided diode of p/i/n system is laminated as a photoconductive layer 103 by means of plasma-CVD method, on which an aluminum electrode pattern operating as 6×6=36 neuron electrodes (2.5×2.5 mm in size) is formed as a reflective electrode 104 by means of evaporation method. Further, the rubbing-treated alignment layer is laminated thereon.

The alignment layer is made of a polyimide represented by the formula (VIII), which is the polyimide(BPDA-P) prepared by polymerizing benzophenonetetracarboxylic dianhydride (hereinafter referred to as BPDA) with oligo-p-phenylenesulfidediamine (in the case of polymerization degree=n, hereinafter referred to as SDA-n). That is, synthesis of polyamic acid as the polyimide precursor is carried out in a solvent of dimethylacetoamide (DMAc) by using BPDA and SDA-n. The resultant polyamic acid is coated on a surface of the substrate to a degree of 50 to 1000 A by spinner and the coated substrate is placed in a heat-treatment oven to heat it at 230° C. for one hour, thereby the film is subjected to imide-formation and crystalization. The alignment treatment is carried out by rubbing the surface with nylon cloth.

On a transparent conductive electrode 108 which is formed uniformly as an ITO electrode pattern on the entire surface of the glass substrate 109, there is laminated a polyimide alignment layer 107 by the same method as above. A liquid crystal of 1 μm in thickness is formed on one side of glass substrate 109 by means of spraying resin beads suspended in isopropyl alcohol. Thereafter, a pair of glass substrates are sealed by UV hardening resin at the circumference to prepare a liquid crystal cell. Into the cell, a ferroelectric liquid crystal (ZLI-3654 from Merk Inc.) is injected under a vacuum condition. In order to obtain uniform alignment, it is thereafter heated to more than the phase transition temperature of ZLI-3654 (62° C.) and then cooled to a room temperature at the annealing speed of 1 üÄ/min to make it re-oriented. The polarization directions of the polarizer 110 and the analyzer 111 are orthogonal to each other.

In order to examine the operational characteristic of the spatial light modulator by means of Using a white light as a input light 113, AC voltage is applied to it. As a result, the intensity ratio of output light 114 to input light is 70~85%, which is confirmed to be a very large value with no consideration of losses resulted from passing through the polarizer 110 and analyzer 111. It is confirmed that the result means that input light intensity of more than some $\mu W/cm2$ make the output possible to have a first transition and even if the input light intensity is small, the spatial light modulator can be operated. FIG. 3 shows an intensity change of output light 114 when a corresponding input light is increased under a constant voltage. It is also confirmed that even continuous operation does not change the thresholding characteristic and after operation, memory condition is still stable and is maintained for at least more than one month.

EXAMPLE 2

Figure 4:
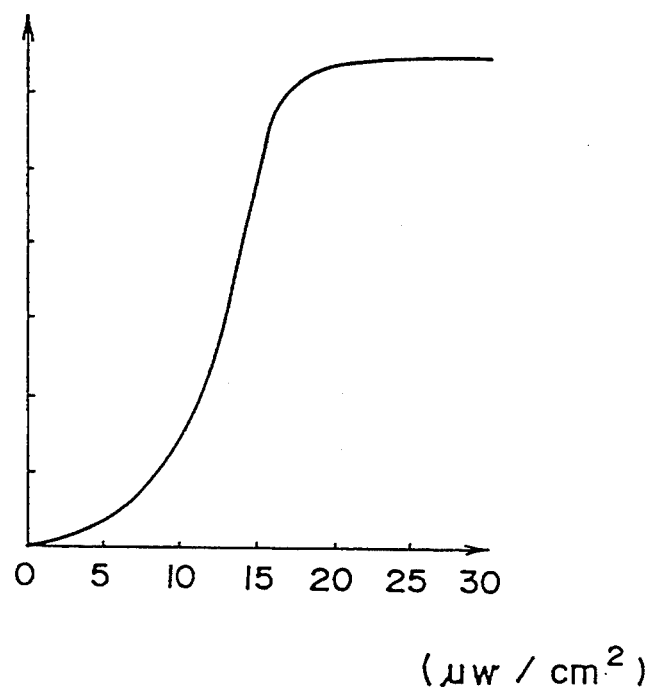
FIG. 4 is a graph showing change of output light intensity when incident light intensity is increased in the reflective type spatial light modulator.

FIG. 4 shows a schematic view of neural network circuit provided with the spatial light modulator 112 used in Example 1, which performs optical summation and thresholding operation. In this system, all operations can be carried out by means of light. As input image patterns, alphabet letters (O,P,T) and their partially lacked letters are used. Their letters are developed on an optical mask means 305 by means of a multi-lenslet array comprising 6×6=36 of lenses (D=3 mm, F=20 mm) arranged in a planner or two-dimensional form. The memory optical mask 305 is constructed of a transparent film with 16 gray levels as a silver salt photograph in order that the transmissivity is corresponding to synapse connection strength resulted from previous learning of 3 letters by means of orthogonal learning method. To each aluminum reflective electrode, there are input lights corresponding to each neuron connections of 36=6×6 pieces. Then, a result from optical product operation of the developed image and the transmissivity of the optical mask means is injected hereto. Thereby, light-carrier corresponding to the sum of light inputs is generated on the photoconductive layer 103 to decrease the resistance and thus the electric field applied to the FLC layer 106 is increased. When the electric field comes to be beyond a predetermined thresholding value, memory condition of FLC layer is reversed and thus is changed from OFF to ON state. The light intensity necessary to perform a light switching function is some 10 $\mu W/cm2$ as shown in FIG. 3. It is confirmed that perfect input pattern of each alphabet letter is demonstrated to give perfect output pattern in the recalling operations. Further, output patterns can be recalled and recognized with 100% degree against imperfect input patterns up to hamming distances with 2.

EXAMPLE 3

Figure 5:
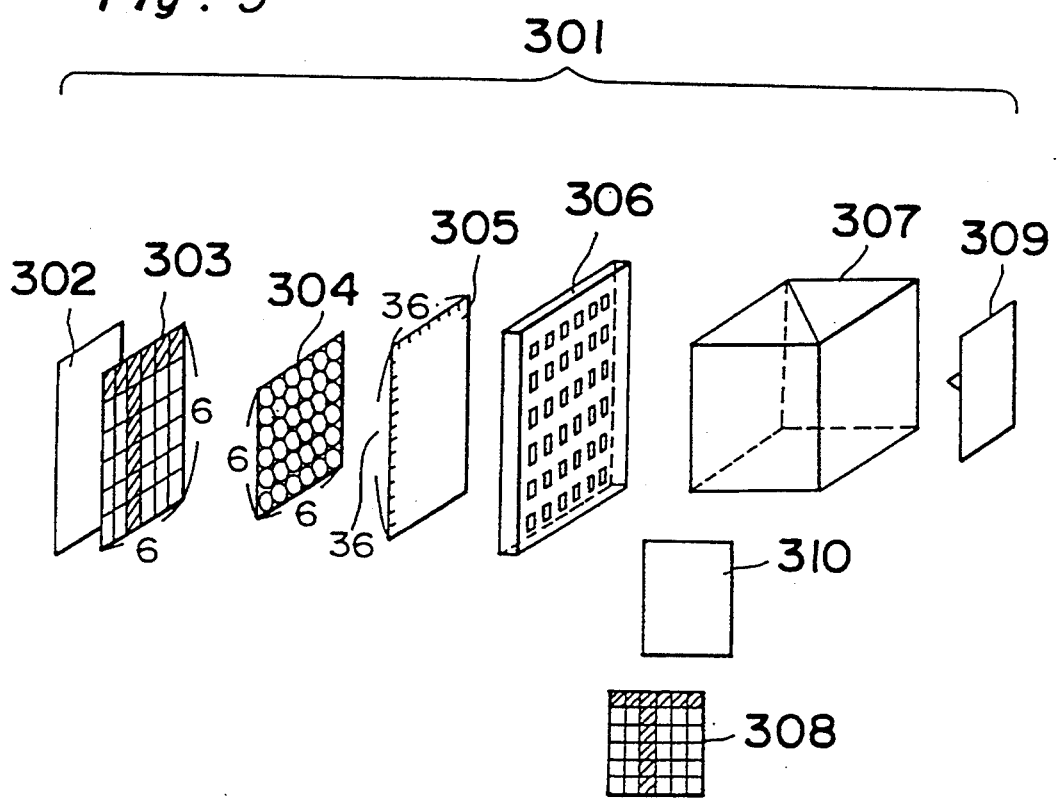
FIG. 5 is a schematic diagram of neural network circuit according to EXAMPLE 2.
Figure 6:
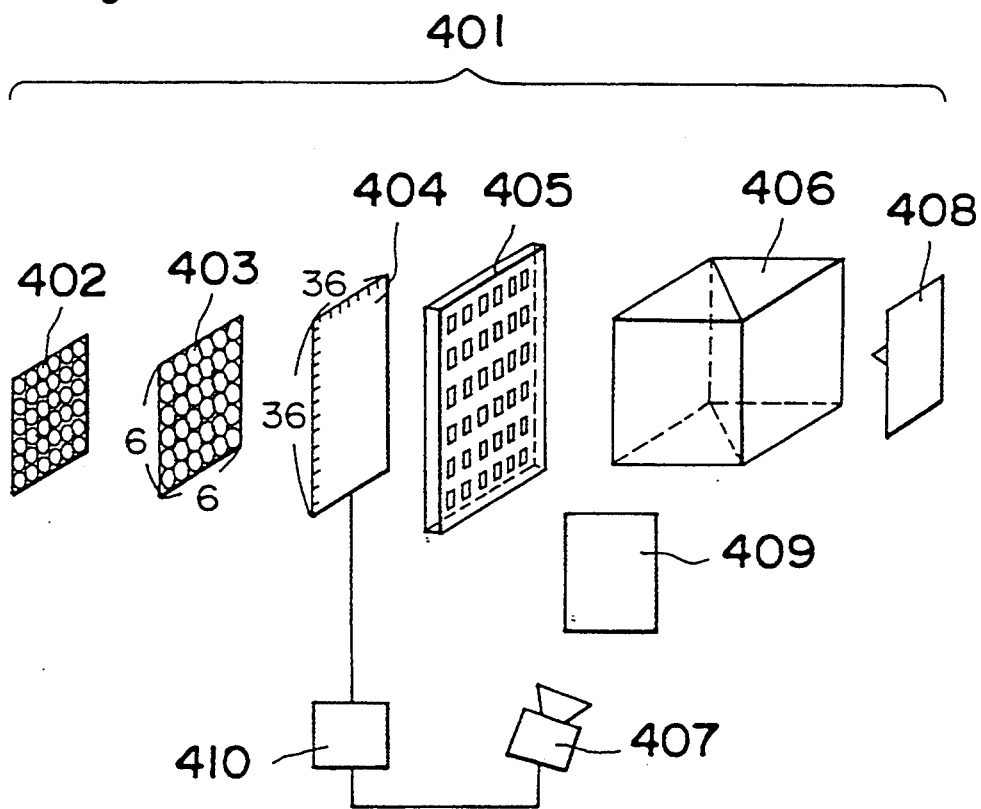
FIG. 6 is a schematic diagram of neural network circuit according to EXAMPLE 3.

In the neural network circuit of Example 2, the optical mask means showing fixed synapse connections is constructed from a liquid crystal display element 404 driven by transistor provided with a learning ability. As shown in FIG. 5, input image is a two-dimensional array comprising 6×6=36 pieces of LED. The multi-lenslet array and the spatial light modulator of Example 1 having optical operation function are arranged in the same manner as Example 2.

The liquid crystal display element 404 is constructed of picture elements (400 μm×400 μm/synapse) in a manner that each picture element acts as each of synapse connections (36×36). In a learning process, output image patterns 407 are caught by CCD camera 410 to calculate the differences between output image and perfect input image by means of personal computer 411, according to which differences the transmissivity of the liquid crystal display element 404 is allowed to be changed.

The recognition rate against imperfect patterns of alphabet 3 letters is valued by using the above system. Firstly, the 3 letters are injected repeatedly in turn until the transmissivity reloading in the mask becomes less than 10% against perfect letter pattern inputs of alphabet 3 letters. The preparation is completed by 5 repeats.

Secondary, imperfect letter patterns are injected into the mask means with a fixed constant transmissivity. Up to hamming distances with 3, 100% recognition is possible.

Therefore, according to the present invention, there is provided a spatial light modulator having an ability to make optical summation and thresholding operations at high speed and also to make stable working. Further, a neural network circuit provided with the spatial light modulator according to the present invention is superior in learning convergence to constitute a system provided with high recognition rate.

What is claimed:

1. A spatial light modulator comprising a photoconductive layer having a rectification function for receiving incident lights to generate charges, an electrode for accumulating the charges and a ferroelectric liquid crystal layer for modulating the incident light, wherein the ferroelectric liquid crystal layer is arranged between a pair of alignment layers made of polyimide represented by the general formula (I);

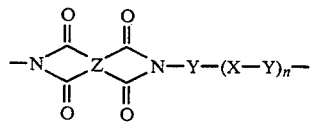 (I)

wherein n is 2 or more, X is S, Se or Te, Y is an aromatic group or a substituted aromatic group, and Z is a group containing an aromatic group.

2. The spatial light modulator according to claim 1, wherein the polyimide of the general formula (I) is obtained by reacting a diamine represented by the formula $NH_2$-Y-(X-Y)$_n$-$NH_2$ (II) wherein n, X and Y are defined in claim 1, with a carboxylic acid containing a Z group as defined in claim 1 to give a polyimide precursor, and subjecting a coated film of the precursor on a desired substrate to a heated condensation polymerization reaction.

* * * * *